United States Patent [19]

Hamann et al.

[11] Patent Number: 5,432,557
[45] Date of Patent: Jul. 11, 1995

[54] EXTENDED TELEVISION SIGNAL RECEIVER

[75] Inventors: Theodora L. Hamann; Wilhelmus A. Van de Goor; Leendert T. Rosendaal; Franciscus W. P. Vreeswijk; Adrianus C. J. G. Van de Waterlaat; Johannes Y. Tichelaar; Teunis Poot, all of Eindhoven, Netherlands

[73] Assignee: U.S. Philips Corporation, New York, N.Y.

[21] Appl. No.: 111,679

[22] Filed: Aug. 25, 1993

[30] Foreign Application Priority Data

Sep. 7, 1992 [EP] European Pat. Off. ............ 92202693
Jan. 26, 1993 [EP] European Pat. Off. ............ 93200212

[51] Int. Cl.⁶ .......................... H04N 7/12; H04N 5/21
[52] U.S. Cl. ..................................... 348/432; 348/627; 348/909
[58] Field of Search ............... 348/426, 427, 428, 429, 348/430, 432, 433, 434, 435, 436, 438, 469, 470, 473, 474, 475, 476, 477, 478, 479, 607, 608, 609, 610, 613, 913, 909; H04N 7/00, 7/12, 7/08, 7/87, 11/02, 5/21

[56] References Cited

U.S. PATENT DOCUMENTS 4,684,989 8/1987 Roeder et al. ...................... 348/607
5,005,082 4/1991 Zdepski et al. ..................... 348/613
5,067,018 11/1991 Sakamoto et al. .................. 348/432
5,121,211 6/1992 Koo .
5,225,907 7/1993 Casavant et al. .................... 348/469

FOREIGN PATENT DOCUMENTS 0460750 11/1991 European Pat. Off. .
4262692 9/1992 Japan .............................. H04N 7/00
4326275 11/1992 Japan .............................. H04N 7/00
2264418 8/1993 United Kingdom .......... H04N 7/00
9009081 8/1990 WIPO .......................... H04N 11/06
9014732 11/1990 WIPO .......................... H04N 7/00

Primary Examiner—James J. Groody
Assistant Examiner—Michael H. Lee
Attorney, Agent, or Firm—Edward W. Goodman

[57] ABSTRACT

In a receiver for extended television signals in which a wide aspect ratio picture and at least one horizontal bar are jointly coded so as to form a standard aspect ratio picture, the at least one horizontal bar conveys vertical resolution enhancement information, and the extended television signal receiver includes an arrangement (107,111) for modifying the vertical resolution enhancement information to reduce an amount of distortions comprised therein, and an arrangement for combining the wide aspect ratio picture and the modified vertical resolution enhancement information to provide an enhanced wide aspect ratio picture.

6 Claims, 2 Drawing Sheets

EXTENDED TELEVISION SIGNAL RECEIVER

BACKGROUND OF THE INVENTION

1. Field of the Invention

The invention relates to a receiver for extended television signals in which a wide aspect ratio picture and at least one horizontal bar are jointly coded so as to form a standard aspect ratio picture. The horizontal bar is used to transmit "hidden" enhancement information which can be used by the extended television signal receiver to improve the vertical resolution of the wide aspect ratio television signal.

2. Description of the Related Art

European Patent Application EP-A-0,460,750 (PHN 13,359) discloses an extended television signal receiver of the above-mentioned type. The amplitude of the enhancement information in the horizontal bars is reduced to decrease the visibility of the enhancement information and to prevent the operation of current television receivers from being disturbed by the enhancement information. However, as a consequence of its reduced amplitude, the enhancement information is more susceptible to noise. When the extended television receiver adds noisy enhancement information to the wide aspect ratio picture to improve the vertical resolution thereof, the whole wide aspect ratio picture will be disturbed by noise.

Another problem is formed by the amplitude response distortion sensitivity of the combination of the wide aspect ratio picture and the enhancement information. The baseband enhancement spectrum corresponds directly to the luminance spectrum. However, in the encoder, the modulated enhancement signal is inverse spectrum vestigial sideband (VSB-) modulated on the color subcarrier. Thus, the original baseband enhancement spectrum has been inverted. In the extended television signal receiver, the modulated enhancement frequency component $\omega_{sc}-\omega$ is demodulated, processed and added to frequency component $\omega$ of the luminance signal. Amplitude response distortions in the channel result in distorted mutual amplitude ratio's of corresponding luminanee/enhancement frequency components.

SUMMARY OF THE INVENTION

It is, inter alia, an object of the invention to provide an extended television signal receiver which is capable of enhancing the vertical resolution of the wide aspect ratio picture even in the presence of noise and/or amplitude response distortions, whereby deteriorations of the output wide aspect ratio picture quality caused by, for example, adding too much noise thereto, are avoided as much as possible. To this end, an extended television signal receiver according to the opening paragraph is characterized in that said extended television signal receiver comprises means for modifying said vertical resolution enhancement information to reduce an amount of distortions contained therein, and means for combining said wide aspect ratio picture and said modified vertical resolution enhancement information to provide an enhanced wide aspect ratio picture.

The invention is based on the recognition that, after reduction of the amount of distortions (noise and/or amplitude response distortions) in the vertical resolution enhancement signal, the vertical resolution enhancement signal can still be used to increase the vertical resolution of the wide aspect ratio picture. Of course, after the reduction of the amount of distortions, the amount of vertical resolution enhancement information might appear to be reduced as well, but this reduced amount of vertical resolution enhancement information is still capable of increasing the vertical resolution of the wide aspect ratio picture.

These and other aspects of the invention will be apparent from and elucidated with reference to the embodiments described hereinafter.

DESCRIPTION OF THE PREFERRED EMBODIMENTS

Figure 1:
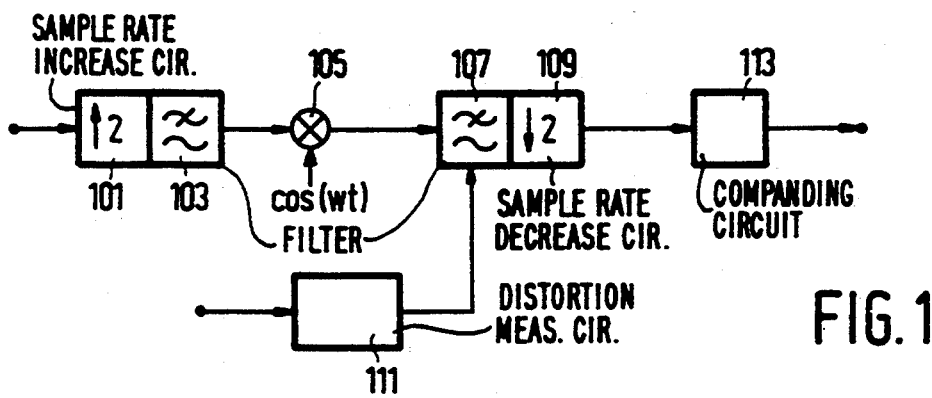
FIG. 1 shows a block diagram of part of a first embodiment of an extended television signal receiver in accordance with the present invention.

In FIG. 1, the vertical resolution enhancement signal from the horizontal bars is applied to a sample rate increase circuit 101 which is followed by a (half) Nyquist filter 103. The sampling rate is temporarily doubled to avoid fold-back components which could be very disturbing. The output of the filter 103 is applied to a demodulator 105, whose carder signal input receives a signal at preferably the color subcarrier frequency. The output of the demodulator 105 is connected to a low-pass filter 107 preceding a sample rate decrease circuit 109 whose output is connected to a companding circuit 113 which is supposed to undo an expanding operation carried out in the encoder. The encoder (not dealt with in this application) expands the amplitude characteristic of the vertical resolution enhancement signals in such a way that small amplitudes which are more susceptible to noise are amplified, while large amplitudes are attenuated to prevent the vertical resolution enhancement signal in the horizontal bars from becoming too visible on current standard television receivers and/or disturbing the correct operation of such receivers. In the receiver, the small amplitudes are reduced and the large amplitudes are amplified to their respective original values. The output of the companding circuit 113 is coupled to a combining circuit (not shown) which combines the high-frequency information of the vertical resolution enhancement signal with the wide aspect ratio picture (having, for example, 430 lines) between the horizontal bars (having, for example, 144 lines) so as to create a screen-filling (i.e., for example, 576 lines high) wide aspect ratio picture having an enhanced vertical resolution.

In another preferred embodiment of the extended television system, a full Nyquist filter is present in the transmitter instead of a half Nyquist filter in the transmitter and a half Nyquist filter in the receiver. If a full Nyquist filter is present in the transmitter, the transmitter further comprises a spectrum shaping filter and the receiver comprises an inverse spectrum shaping filter, for example, a 5 MHz low-pass filter, to cope with the transmission spectrum disadvantages of not having two half Nyquist filters in the transmitter and in the receiver, respectively. The inverse spectrum shaping filter function can easily be carried out by the low-pass filter 107. This yields the advantage that the receiver no longer includes a half Nyquist filter 103, a stable implementation of which being difficult to achieve.

Moreover, the sample rate increase circuit 101 and the sample rate decrease circuit 109 can be left out if the additional complexity caused by these circuits is not deemed to be justified by their advantages. Thus, in a preferred modification of the embodiment shown in FIG. 1, only the elements 105, 107, 113 are present in addition to the element 111 to be discussed below.

The embodiment shown in FIG. 1 is characterized by a distortion measurement circuit 111 which furnishes a distortion measurement signal to control the low-pass filter 107. When the distortion measurement circuit 111 is a noise measurement circuit, it may produce the noise measurement signal on the basis of the amount of bit errors in the digital control signal which is included in the extended television signal (see European patent application 92.200.407.2 filed on 13.02.92, attorney's docket PHN 13,988, corresponding to U.S. Pat. No. 5,323,236). Alternatively, the amount of noise may be measured in other digital (audio) signals within the vertical blanking period, within the horizontal blanking period (see European patent application 91.203.289.3 filed on 13.12.91, attorney's docket PHN 13,935, corresponding to U.S. patent application Ser. No. 07/977,482, filed Nov. 17, 1992), in the wide aspect ratio picture, in the vertical resolution enhancement information itself, or in (test) signals with known contents in the vertical blanking interval. When the noise measurement signal indicates the presence of noise, the passband of the low-pass filter 107 is reduced so as to diminish the noisy high frequency components. This reduction may be carried out gradually or in fixed steps.

Figure 2:
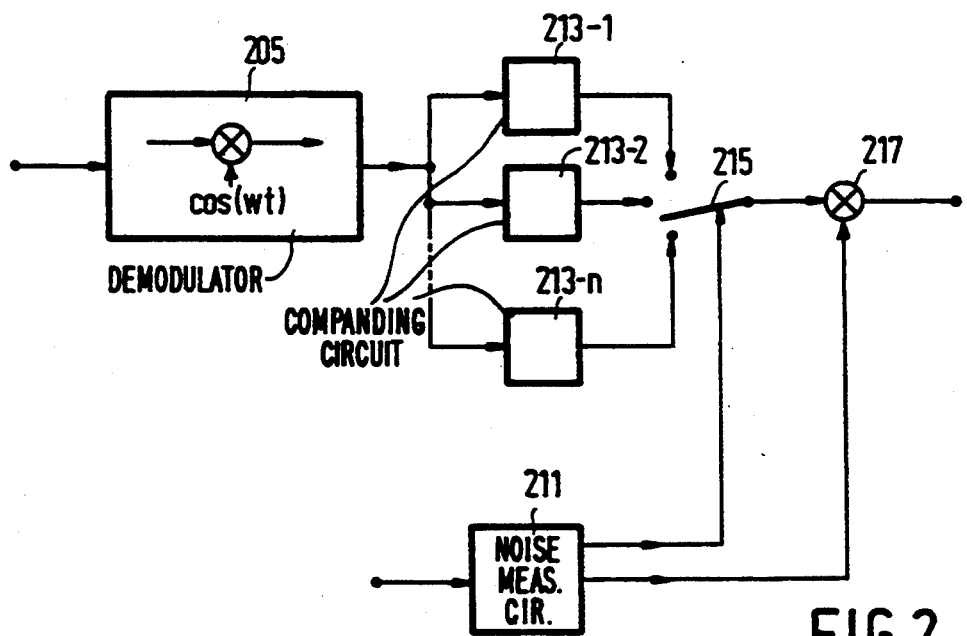
FIG. 2 shows a block diagram of part of a second embodiment of an extended television signal receiver in accordance with the present invention.

In FIG. 2, the vertical resolution enhancement signal from the horizontal bars is applied to a demodulator arrangement 205 which corresponds to the elements 101 through 109 shown in FIG. 1. The output of the demodulator arrangement 205 is applied to companding circuits 213-1, 213-2 ... 213-n, which operate in accordance with n mutually different companding curves. For example, the companding curve of companding circuit 213-1 is the inverse of the expanding curve used in the encoder, while the companding curves of the companding circuits 213-2 ... 213-n have reduced maximum amplitude differences with regard to a center digital amplitude value 128. A selector 215 selects the output of that companding circuit which has the optimum companding curve in view of the amount of noise as determined by the noise measurement circuit 211 which corresponds to noise measurement circuit 111 shown in FIG. 1. The output of the selector 215 is connected to an attenuator 217 to attenuate the vertical resolution enhancement signal in dependence on the noise measurement signal. It will be evident that it is not necessary to have both the companding circuits 213-1 . . . 231-n and the attenuator 217, while the plurality of companding circuits 213-1 . . . 213-n and the selector 215 may be replaced by a single companding circuit having a noise-adaptive companding curve.

Figure 3:
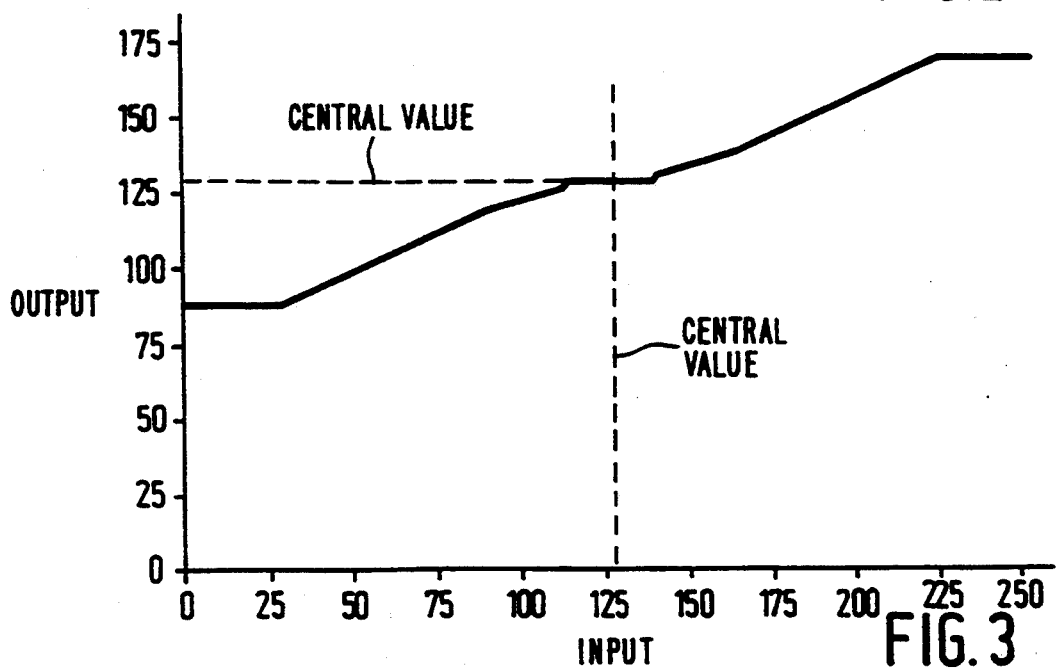
FIG. 3 shows a companding curve for a noisy vertical resolution enhancement signal.

An example of such a modified companding curve is shown in FIG. 3. In this companding curve, the maximum digital amplitude difference is, for example, 40, while in the unmodified companding curve used in the companding circuit 213-1, the maximum digital amplitude difference may be, for example, 87. Small amplitudes are less amplified than in an unmodified curve so as to reduce noise in areas, while large amplitudes are less amplified than in an unmodified curve so as to decrease any possible noise peaks.

In the following, a method will be presented for automatic reduction of enhancement artifacts caused by amplitude response distortions. A preferred method for video spectrum equalization is video ghost cancellation. The state of the art is a ghost canceller that makes use of a Ghost Canceller Reference (GCR) signal as has been described in the U.S. Pat. No. 5,121,211 (PHA 21,667), which should be incorporated somewhere in the video signal. By means of such a GCR signal, not only amplitude response distortions but also phase distortions can be compensated for. However, such a ghost cancellation system is still rather costly.

The method introduced hereinafter, is based on letting the bandwidth of the enhancement signal depend on the difference in gain and/or power of corresponding frequency components and/or frequency bands of the baseband (demodulated) enhancement signal and the luminanee signal of the wide aspect ratio picture, in the frequency range of interest. For example, frequency components $(\omega_{sc}-\omega)$ and $(\omega_{sc}+\omega)$ of the modulated enhancement signal result in frequency component $\omega$ of the baseband (demodulated) enhancement signal which correspond to frequency $\omega$ of the luminance signal. (Spectral components with frequency $(\omega_{sc}+\omega)$ have only relevance, if they are located in the upper part of the Nyquist flank of the VSB- spectrum.) Frequency bands $[(\omega_{sc}-\omega_2), (\omega_{sc}-\omega_1)]$ and $[(\omega_{sc}+\omega_1), (\omega_{sc}+\omega_2)]$ of the modulated enhancement signal result in a frequency band $[\omega_1, \omega_2]$ of the baseband (demodulated) enhancement signal which corresponds to the frequency band $[\omega_1, \omega_2]$ of the luminance signal, assuming that $\omega_{sc} > \omega_2 > \omega_1 \geq 0$.

The difference in gain of baseband (demodulated) enhancement signal and corresponding luminance frequency components, can be expressed as:

$$\Delta G(\omega) = \frac{|H_{demodulated\ enhancement}(j\omega)|}{|H_{luminance}(j\omega)|}$$

where $\omega \in [0, \Omega_{enhancement}]$, $\Omega_{enhancement} < \omega_{sc}$, with $\omega$ being the angular frequency, and $|H_{demodulate\ enhancement}(j\omega)|$, $|H_{huminance}(j\omega)|$ are the frequency responses for the enhancement signal and the luminance signal, respectively.

For a good operation of a practical enhanced television signal receiver, a gain adjustment of the enhancement signal has to be performed. Single or multi-tone gain adjustment is possible. Although single tone gain adjustment is discussed below, an extension to multiple tones is possible.

The simplest approach is a single tone gain adjustment of the enhancement signal, as for example, is commonly used in TV receivers to adjust the color saturation. For gain adjustment between enhancement and luminanee signals, the following processing has to be performed:

The difference in enhancement/luminance gain at dc is determined by using appropriate references in the video signal. For example, for the PALplus system, there are plans to incorporate a color subcarrier burst (which forms a modulated dc baseband enhancement signal) into the second half of I, B, G/PAL CVBS line 23 and a luminance white step reference into the first half of line 623.

The amount that this gain difference differs from 0 dB, determines the bandwidth of the LPF 107 in the enhancement signal path. The greater the difference, the less the LPF enhancement bandwidth should be. The bandwidth reduction filter operation can be implemented by a digital filter. This digital filter should be of a type that is reloadable with a new set of filter coefficients. Multiple filter coefficients sets, applying to multiple different low-pass filters, should be available in memory. A table holds values that translates the gain adjust figure into the number of the appropriate set of filter coefficients. This set is transferred to the digital filter. The new low-pass filter characteristic is now installed.

Reset a gain adjustment to be applied on the low pass filtered enhancement signal.

Figure 4:
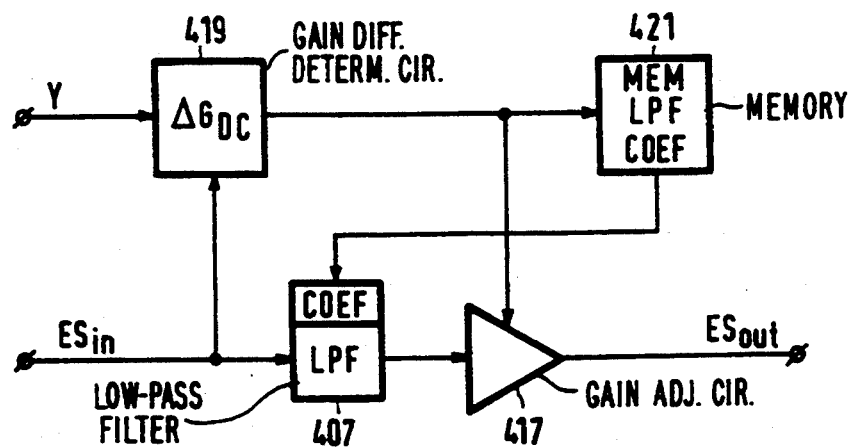
FIG. 4 shows a first preferred partial elaboration of the block diagram of FIG. 1.

This method lets the maximum absolute gain difference between the luminance and enhancement frequency components decrease, resulting in less enhancement artifacts. An implementation is sketched in FIG. 4. An input enhancement signal $ES_{IN}$ from the demodulator 103 (FIG. 1) and a wide aspect ratio picture luminance signal Y are applied to gain difference determining circuit 419, which determines the gain difference $\Delta G$ at DC. The input enhancement signal $ES_{IN}$ is also applied to a digital low-pass filter 407, whose coefficients are obtained from a coefficient memory 421 which is controlled by the gain difference determining circuit 419. The gain difference determining circuit 419 also controls a gain adjustment circuit 417 which receives the low-pass filtered enhancement signal and furnishes the output enhancement signal $ES_{OUT}$ which can be further processed by the companding circuit 113 (FIG. 1).

As the visibility of the enhancement artifacts increases when an increasing amount of enhancement information is added to the luminance signal, the enhancement bandwidth reduction function might be a non-symmetric function of the enhancement-luminance gain difference.

Figure 5:
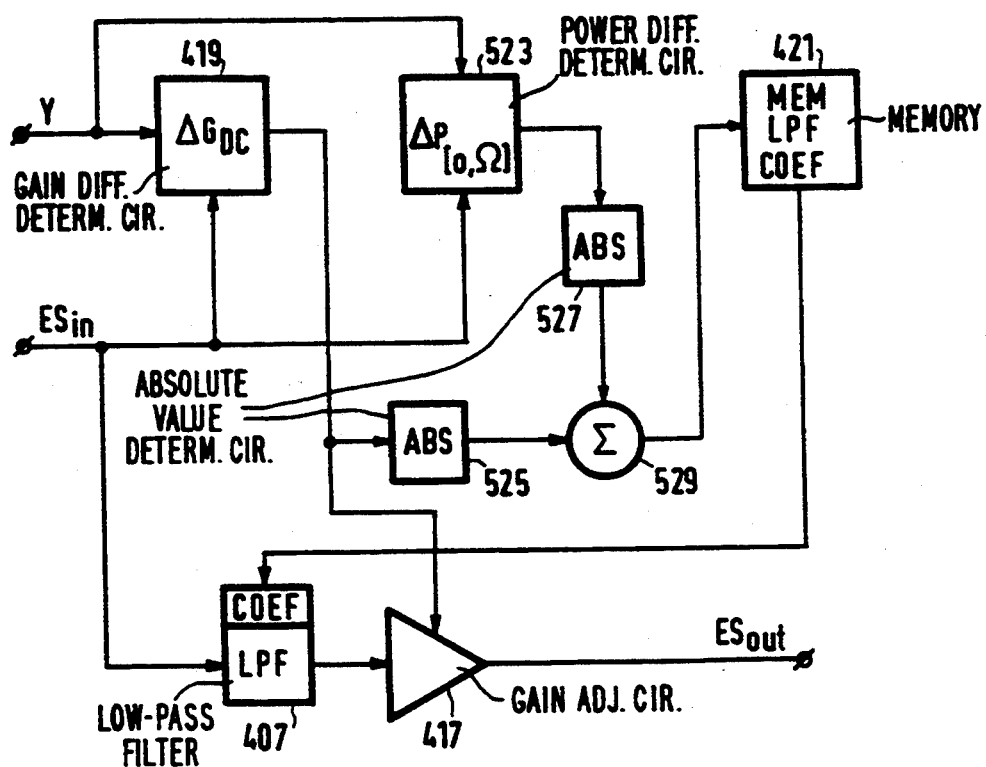
FIG. 5 shows a second preferred partial elaboration of the block diagram of FIG. 1.

A variant of this single tone approach, is the addition of a measurement of the power difference between, on the one hand, the baseband (demodulated) enhancement signal (through the enhancement signal processing path) and, on the other hand, the corresponding luminanee signal (via the luminanee path). A reference signal that could be used for this purpose, is a GCR signal as described in U.S. Pat. No. 5,121,211 (PHA 21,667), because it has a flat power spectral density function. The difference in dB of these two power measurements should be added to the luminance/enhancement signal gain difference in dB. The greater the absolute ratio in dB, the less enhancement bandwidth should be passed. In FIG. 5, an implementation of this method is presented. The embodiment of FIG. 5 differs from that of FIG. 4 in that the coefficient memory 421 is not only controlled by the gain difference determining circuit 419, but also by a power difference determining circuit 523 which receives the luminance signal Y and the input enhancement signal $ES_{IN}$. The power difference is determined over a frequency range $[0, \Omega]$. Output signals of the difference determining circuits 419 and 523 are summed by an adder 529 after taking the absolute values of the output signals by absolute value determining circuits 525 and 527, respectively. The adder 529 controls the coefficient memory 421.

It should be noted that the above-mentioned embodiments illustrate rather than limit the invention, and that those skilled in the art will be able to design many alternative embodiments without departing from the scope of the appended claims. For example, in an extended television system in which the vertical resolution enhancement information is divided into a low-frequency part which is modulated on a subcarrier and a high-frequency part which is not modulated (see European patent application 92.202.496.3 filed on 13.08.92, attorney's docket PHN 14,166, corresponding to U.S. patent application Ser. No. 08/106,094, filed Aug. 12, 1993), both the low-frequency and the high-frequency parts may be used to enhance the vertical resolution when only a small amount of distortions is present, while with larger amounts of distortions, only the low-frequency part is used and with high amounts of distortions, no enhancement is applied to the wide aspect ratio picture.

We claim:

1. A receiver for extended television signals in which a wide aspect ratio picture and at least one horizontal bar are jointly coded so as to form a standard aspect ratio picture, said at least one horizontal bar conveying a vertical resolution enhancement signal, said extended television signal receiver comprising:

means for modifying said vertical resolution enhancement signal to reduce an amount of distortions contained therein, said modifying means comprising means for measuring distortion in a signal component of said extended television signal and forming a distortion measurement signal, and means for low-pass filtering said vertical resolution enhancement signal, a passband of said low-pass filtering means being dependent on said distortion measurement signal; and means for combining said wide aspect ratio picture and said modified vertical resolution enhancement signal to provide an enhanced wide aspect ratio picture.

2. A receiver for extended television signals in which a wide aspect ratio picture and at least one horizontal bar are jointly coded so as to form a standard aspect ratio picture, said at least one horizontal bar conveying a vertical resolution enhancement signal, said extended television signal receiver comprising:

means for modifying said vertical resolution enhancement signal to reduce an amount of distortions contained therein, said modifying means comprising means for measuring distortion in a signal component of said extended television signal and forming a distortion measurement signal, and a plurality of companding circuits coupled to receive said vertical resolution enhancement signal, and a selection circuit for selecting one of the outputs of said companding circuits in dependence on said distortion measurement signal.

3. A receiver as claimed in claim 1, said receiver comprising means, coupled to receive said extended television signal, for providing said vertical resolution enhancement signal and a luminance signal, wherein said distortion measurement signal represents an amount of amplitude response distortions, and the means for measuring distortion comprises gain difference determining means coupled to receive said vertical resolution enhancement signal and said luminance signal of said wide aspect ratio picture, for determining a difference in gain between said vertical resolution enhancement signal and said luminance signal to produce said distortion measurement signal.

4. A receiver as claimed in claim 3, wherein the means for measuring distortion also comprises power difference determining means coupled to receive said vertical resolution enhancement signal and said luminance signal for determining a difference in power between said vertical resolution enhancement signal and said luminance signal over a frequency range of said vertical resolution enhancement signal, and adding means coupled to receive absolute values of output signals of the gain difference determining means and the power difference determining means for producing said distortion measurement signal.

5. A receiver as claimed in claim 2, wherein said signal component comprises a digital control signal included in said extended television signal, and said distortion measurement signal depends on a bit error rate in said digital control signal.

6. A receiver as claimed in claim 1, wherein said signal component comprise a digital control signal included in said extended television signal, and said distortion measurement signal depends on a bit error rate in said digital control signal.

* * * * *

UNITED STATES PATENT AND TRADEMARK OFFICE
CERTIFICATE OF CORRECTION

PATENT NO. : 5,432,557
DATED : July 11, 1995
INVENTOR(S) : Theodora L. Hamann, et. al.

It is certified that error appears in the above-indentified patent and that said Letters Patent is hereby corrected as shown below:

Title page, item [75], Inventors: should be --Leendert T. Rozendaal--.

Signed and Sealed this

Seventh Day of May, 1996

Attest:

BRUCE LEHMAN

*Attesting Officer*        *Commissioner of Patents and Trademarks*